(12) United States Patent
Zeng et al.

(10) Patent No.: US 10,915,815 B1
(45) Date of Patent: Feb. 9, 2021

(54) INFORMATION PROCESSING METHOD, SYSTEM AND DEVICE BASED ON CONTEXTUAL SIGNALS AND PREFRONTAL CORTEX-LIKE NETWORK

(71) Applicant: INSTITUTE OF AUTOMATION, CHINESE ACADEMY OF SCIENCES, Beijing (CN)

(72) Inventors: Guanxiong Zeng, Beijing (CN); Yang Chen, Beijing (CN); Shan Yu, Beijing (CN)

(73) Assignee: INSTITUTE OF AUTOMATION, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 16/971,691

(22) PCT Filed: Apr. 19, 2019

(86) PCT No.: PCT/CN2019/083356
§ 371 (c)(1),
(2) Date: Aug. 21, 2020

(87) PCT Pub. No.: WO2020/151108
PCT Pub. Date: Jul. 30, 2020

(30) Foreign Application Priority Data

Jan. 22, 2019 (CN) .......................... 2019 1 0058284

(51) Int. Cl.
*G06K 9/62* (2006.01)
*G06N 3/08* (2006.01)

(52) U.S. Cl.
CPC ............ *G06N 3/08* (2013.01); *G06K 9/6201* (2013.01); *G06K 9/6228* (2013.01); *G06K 9/6232* (2013.01); *G06K 9/6268* (2013.01)

(58) Field of Classification Search
None
See application file for complete search history.

(56) References Cited

U.S. PATENT DOCUMENTS

| 8,442,321 B1 | 5/2013 | Chang et al. |
| 9,946,344 B2 * | 4/2018 | Ayaz ........................ G06F 3/015 |

(Continued)

FOREIGN PATENT DOCUMENTS

| CN | 101021849 A | 8/2007 |
| CN | 101853426 A | 10/2010 |

(Continued)

OTHER PUBLICATIONS

Wei-Dong Xu et al., Potato surface defects detection based on convolution neural networks and support vector machine algorithm, Jiangsu J. of Agr. Sci., 2018, pp. 1378-1385, 34(6).

(Continued)

*Primary Examiner* — Delomia L Gilliard
(74) *Attorney, Agent, or Firm* — Bayramoglu Law Offices LLC

(57) ABSTRACT

An information processing method based on contextual signals and a prefrontal cortex-like network includes: selecting a feature vector extractor based on obtained information to perform feature extraction to obtain an information feature vector; inputting the information feature vector into the prefrontal cortex-like network, and performing dimensional matching between the information feature vector and each contextual signal in an input contextual signal set to obtain contextual feature vectors to constitute a contextual feature vector set; and classifying each feature vector in the contextual feature vector set by a feature vector classifier to obtain classification information of the each feature vector to constitute a classification information set. An information processing system based on contextual signals and a prefrontal cortex-like network includes an acquisition module, (Continued)

a feature extraction module, a dimensional matching module, a classification module and an output module.

20 Claims, 3 Drawing Sheets

(56) References Cited

U.S. PATENT DOCUMENTS

| | | | |
|---|---|---|---|
| 2005/0036676 | A1 | 2/2005 | Heisele |
| 2009/0157481 | A1* | 6/2009 | Jung .................. A61B 5/04842 709/205 |
| 2009/0157625 | A1* | 6/2009 | Jung ...................... A61B 6/501 |
| 2009/0157660 | A1* | 6/2009 | Jung ...................... G06Q 30/00 |
| 2010/0249573 | A1* | 9/2010 | Marks ................ G01R 33/4806 600/411 |
| 2012/0093381 | A1* | 4/2012 | Fan ........................ G06T 7/143 382/131 |
| 2018/0184964 | A1* | 7/2018 | Simon ....................... G06F 1/14 |
| 2018/0314879 | A1* | 11/2018 | Khwaja .............. A61B 5/02405 |
| 2019/0082990 | A1* | 3/2019 | Poltorak ............... A61B 5/0476 |
| 2019/0107888 | A1* | 4/2019 | Sereshkeh .............. A61B 5/726 |
| 2019/0159712 | A1* | 5/2019 | Marks ................ A61B 5/1176 |
| 2020/0060566 | A1* | 2/2020 | Howard ............ A61B 5/04017 |
| 2020/0129110 | A1* | 4/2020 | Mountford .......... G06K 9/6267 |
| 2020/0387603 | A1* | 12/2020 | Weldemariam .......... G06N 5/02 |

FOREIGN PATENT DOCUMENTS

| | | | | |
|---|---|---|---|---|
| CN | 105678150 | A | | 6/2016 |
| CN | 106650796 | A | | 5/2017 |
| CN | 106934068 | A | | 7/2017 |
| CN | 107690034 | A | | 2/2018 |
| CN | 107766324 | A | * | 3/2018 |
| CN | 108937968 | A | | 12/2018 |
| CN | 109171769 | A | | 1/2019 |
| CN | 109726389 | A | * | 5/2019 |
| WO | WO-2018175698 | A1 | * | 9/2018 ........... G06N 3/0445 |

OTHER PUBLICATIONS

Guaxiong Zang et al., Continuous Learning of Context-dependent Processing in Neural Networks, Oct. 5, 2018, pp. 1-16.

* cited by examiner

INFORMATION PROCESSING METHOD, SYSTEM AND DEVICE BASED ON CONTEXTUAL SIGNALS AND PREFRONTAL CORTEX-LIKE NETWORK

CROSS REFERENCE TO THE RELATED APPLICATIONS

This application is the national phase entry of International Application No. PCT/CN2019/083356, filed on Apr. 19, 2019, which is based upon and claims priority to Chinese Patent Application No. 201910058284.2, filed on Jan. 22, 2019, the entire contents of which are incorporated herein by reference.

TECHNICAL FIELD

The present invention belongs to the field of pattern recognition and machine learning, and more particularly, relates to an information processing method, system and device based on contextual signals and a prefrontal cortex-like network.

BACKGROUND

One of the hallmarks of advanced intelligence is flexibility. Humans can respond differentially to the same stimulus according to different goals, environments, internal states and other situations. The prefrontal cortex, which is highly elaborated in primates, is pivotal for such an ability. The prefrontal cortex can quickly learn the "rules of the game" and dynamically apply them to map the sensory inputs to context-dependent tasks based on different actions. This process, named cognitive control, allows primates to behave appropriately in an unlimited number of situations.

Current artificial neural networks are powerful in extracting advanced features from the original data to perform pattern classification and learning sophisticated mapping rules. Their responses, however, are largely dictated by network inputs, exhibiting stereotyped input-output mappings. These mappings are usually fixed once the network training is completed.

Therefore, the current artificial neural networks lack enough flexibility to work in complex situations in which the mapping rules may change according to the context and these rules need to be learned "on the go" from a small number of training samples. This constitutes a significant ability gap between artificial neural networks and human brains.

SUMMARY

In order to solve the above-mentioned problems in the prior art, that is, to solve the problem that the system has a complex structure, poor flexibility, and requires massive training samples when performing complex multi-tasking, inspired by the function of the prefrontal cortex, the present invention provides an information processing method based on contextual signals and a prefrontal cortex-like network, including:

step S10: selecting a feature vector extractor based on obtained information to perform feature extraction to obtain an information feature vector;

step S20: inputting the information feature vector into the prefrontal cortex-like network, and performing dimensional matching between the information feature vector and each contextual signal in an input contextual signal set to obtain contextual feature vectors to constitute a contextual feature vector set; and step S30: classifying each feature vector in the contextual feature vector set by a feature vector classifier to obtain classification information of the each feature vector to constitute a classification information set, wherein the feature vector classifier is a mapping network of the contextual feature vectors and the classification information.

In some preferred embodiments, the step of "selecting the feature vector extractor" in step S10 includes:

based on a preset feature vector extractor library, selecting the feature vector extractor corresponding to a category of the obtained information.

In some preferred embodiments, a method for constructing the feature vector extractor includes:

based on a training data set, iteratively updating a weight of a parameter in a feature vector extraction network by an Adam algorithm, wherein the feature vector extraction network is constructed based on a deep neural network; and using a network obtained after removing the last classification layer of the trained feature vector extraction network as the feature vector extractor.

In some preferred embodiments, the step of "inputting the information feature vector into the prefrontal cortex-like network and performing the dimensional matching between the information feature vector and the each contextual signal in the input contextual signal set to obtain the contextual feature vectors" in step S20 includes:

step S201: constructing a weight matrix based on the contextual signal and the prefrontal cortex-like network, and normalizing each column of the weight matrix;

$$W^{in}=[w_1^{in}, w_2^{in}, \ldots, w_m^{in}] \in R^{k \times m}$$

$$\|w_i^{in}\|=1, i=1,2,\ldots,m,$$

where, $W^{in}$ denotes the weight matrix, $\|W_i^{in}\|$ denotes a normalized module of $W_i^{in}$, i denotes a dimension index of a hidden layer, k denotes a dimension of an input feature, and m denotes a dimension of the hidden layer;

step S202: based on the weight matrix, performing the dimensional matching between the contextual signal and the information feature vector to obtain the contextual feature vectors;

$$Y^{out}=g([c_1 \cos\theta_1, c_2 \cos\theta_2, \ldots, c_m \cos\theta_m]^T)\|F\|,$$

where, $Y^{out}$ denotes the contextual feature vectors, and $Y^{out}=[y_1, y_2, \ldots, y_m]^T \in R^m$; F denotes the information feature vector, and $F=[f_1, f_2, \ldots, f_k]^T \in R^k$; C denotes the each contextual signal, and $C=[c_1, c_2, \ldots, c_m]^T \in R^m$; $\odot$ denotes element-wise multiplication of the vector; $\theta_m$ denotes an angle between $w_m^{in}$ and F, and $g=\max(0, x)$; $W^{in}$ denotes the weight matrix, and $W^{in}=[w_1^{in}, w_2^{in}, \ldots, w_m^{in}] \in R^{k \times m}$; and step S203: constructing the contextual feature vector set by the contextual feature vectors obtained after performing the dimensional matching between each contextual signal in the contextual signal set and the information feature vector.

In some preferred embodiments, the feature vector classifier in step S30 is constructed based on the following equations:

$$Y^{Lable}=(W^{out})^T Y^{out}=\|W^{out}\|\|F\|\cos\phi,$$

$$\phi = \arccos\left(\frac{\sum_{j=1}^{n} w_j c_j g(\cos\theta_j)}{\|W^{out}\|}\right),$$

where, $Y^{Lable}$ denotes the classification information, $W^{out}$ denotes a classification weight of the classifier, $Y^{out}$ denotes an output feature of the prefrontal cortex-like network, n denotes a dimension of an output weight of the prefrontal cortex-like network, and F denotes the information feature vector.

In some preferred embodiments, configuration parameters of the Adam algorithm include:

a learning rate of 0.1, a weight decay rate of 0.0001, and a batch size of 256.

In some preferred embodiments, the contextual signal is a multi-dimensional word vector corresponding to a classification attribute, and a dimension of the word vector is 200.

In some preferred embodiments, the weight matrix $W^{in}$ is:

a matrix constructed based on a dimension of a word vector and a dimension of the prefrontal cortex-like network, wherein the matrix has a size of the dimension of the word vector x the dimension of the prefrontal cortex-like network.

According to the second aspect of the present invention, an information processing system based on contextual signals and a prefrontal cortex-like network includes an acquisition module, a feature extraction module, a dimensional matching module, a classification module and an output module.

The acquisition module is configured to obtain input information and an input contextual signal set and input.

The feature extraction module is configured to extract features of the input information by using a feature vector extractor corresponding to the input information to obtain an information feature vector.

The dimensional matching module is configured to input the information feature vector into the prefrontal cortex-like network, and perform dimensional matching between the information feature vector and each contextual signal in the input contextual signal set to obtain contextual feature vectors to constitute a contextual feature vector set.

The classification module is configured to classify each feature vector in the contextual feature vector set by a pre-constructed feature vector classifier to obtain classification information of the each feature vector to constitute a classification information set.

The output module is configured to output the acquired classification information set.

According to the third aspect of the present invention, a storage device is provided, wherein a plurality of programs are stored in the storage device, and the programs are configured to be loaded and executed by a processor to implement the information processing method based on the contextual signals and the prefrontal cortex-like network described above.

According to the fourth aspect of the present invention, a processing device includes a processor and a storage device. The processor is configured to execute a plurality of programs. The storage device is configured to store the plurality of programs. The programs are configured to be loaded and executed by the processor to implement the information processing method based on the contextual signals and the prefrontal cortex-like network described above.

The present invention has the following advantages.

(1) The multi-task information processing method of the present invention based on the contextual signals uses a prefrontal cortex-like module to realize the multi-task learning oriented to the scene information. When the contextual information cannot be determined in advance, the mapping depending on the contextual information can be gradually learned step by step. The data processed by the method of the present invention can be applied to multi-task learning or sequential multi-task learning with higher requirements, whereby the network structure can be simplified, thus reducing the difficulty of multi-task learning and increasing the flexibility of the system.

(2) In the present invention, the deep neural network is used as the feature extractor, and the optimization method is designed on the linear layer. In this way, the deep neural network exerts its full role, and the design difficulty is reduced.

(3) In the method of the present invention, the contextual signals are designed and can be changed according to the change of the current working environment, which solves the disadvantage that the neural network cannot respond differently to the same stimulus according to different goals, environments, internal states and other situations.

BRIEF DESCRIPTION OF THE DRAWINGS

By reading the detailed description of the non-restrictive embodiment with reference to the following drawings, other features, objectives and advantages of the present invention will become better understood.

DETAILED DESCRIPTION OF THE EMBODIMENTS

Figure 1:
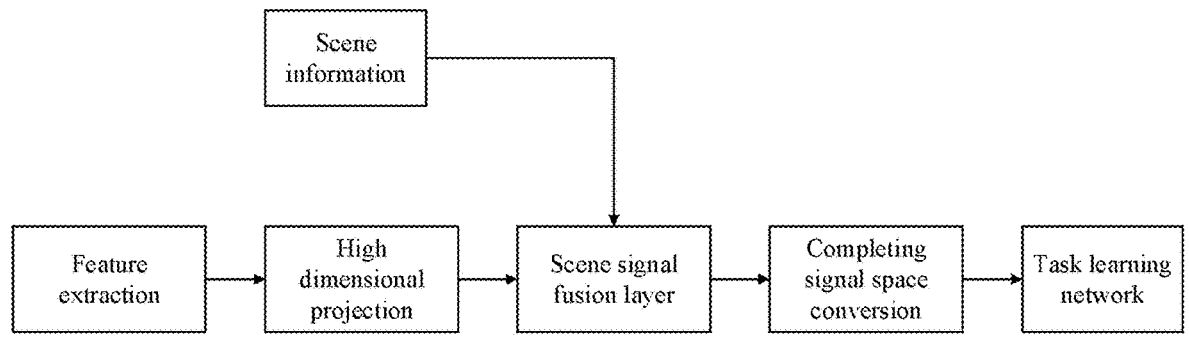
FIG. 1 is a schematic flowchart of the information processing method based on the contextual signals and the prefrontal cortex-like network of the present invention.

The present invention is further described in detail hereinafter with reference to the drawings and embodiments. Understandably, the specific embodiments described herein are only used to explain the present invention rather than to limit the present invention. In addition, it should be noted that for the convenience of description, only the parts related to the present invention are shown in the drawings.

It should be noted that without conflict, the embodiments in the present invention and the features in the embodiments may be combined with each other. The present invention will be explained in detail with reference to the drawings and embodiments below.

An information processing method based on contextual signals and a prefrontal cortex-like network includes:

step S10: a feature vector extractor is selected based on obtained information to perform feature extraction to obtain an information feature vector;

step S20: the image feature vector is input into a prefrontal cortex-like network, and dimensional matching is performed between the image feature vector and each contextual signal in an input contextual signal set to obtain contextual feature vectors to constitute a contextual feature vector set; and step S30: each feature vector in the contextual feature vector set is classified by a feature vector classifier to obtain classification information of the each feature vector to constitute a classification information set, wherein the feature vector classifier is a mapping network of the contextual feature vectors and the classification information.

In order to more clearly explain the information processing method based on the contextual signals and the prefrontal cortex-like network of the present invention, the steps in the embodiment of the method of the present invention are described in detail below with reference to FIG. 1.

An information processing method based on contextual signals and a prefrontal cortex-like network according to the first embodiment of the present invention includes steps S10-step S30, and each step is described in detail as follows.

Step S10: a feature vector extractor is selected based on obtained information to perform feature extraction to obtain an information feature vector.

Based on a preset feature vector extractor library, the feature vector extractor corresponding to the category of the obtained information is selected.

The feature vector extractor library includes at least one selected from the group consisting of an image feature vector extractor, a speech feature vector extractor and a text feature vector extractor. Alternatively, the feature vector extractor library can also include feature vector extractors of other common information categories, which are not enumerated in detail herein. In the present invention, the feature vector extractor can be constructed based on the deep neural network. For example, a deep neural network such as a residual neural network (ResNet) can be selected for the input image information. The deep neural network such as a convolutional neural network (CNN), long short-term memory (LSTM) neural network and gated recurrent unit (GRU) neural network can be selected for the input speech information. The deep neural network such as fastText, Text-convolutional neural network (TextCNN) and Text-recurrent neural network (TextRNN) can be used for the input text information.

In the real environment, information is generally multimodal, and features thereof can be extracted by simultaneously using several feature vector processors in combination, which can not only enrich the expression of information, but also significantly reduce the dimension of the original information to facilitate processing the downstream information.

A method for constructing each feature vector extractor in the feature vector extractor library includes:

based on the training data set, a weight of a parameter in a feature vector extraction network is iteratively updated by the Adam algorithm, wherein the feature vector extraction network is constructed based on a deep neural network; and a network obtained after removing the last classification layer of the trained feature vector extraction network is used as the feature vector extractor.

In the preferred embodiment of the present invention, the Adam algorithm has a learning rate of 0.1, a weight decay rate of 0.0001, and a batch size of 256. The training data set used in the present invention is the face data set CelebFaces Attributes (CelebA) (CelebA is the open data of the Chinese University of Hong Kong, containing 202599 face images of 10177 celebrities, each with 40 corresponding attributes. Each attribute is used as a kind of scene, and different scenes correspond to different contextual signals.)

The deep neural network ResNet50 is trained using the Adam algorithm, and the last classification layer of the ResNet50 network is removed. The output of the penultimate layer of the ResNet50 network is used as the feature of face data and has 2048 dimensions.

Figure 2:
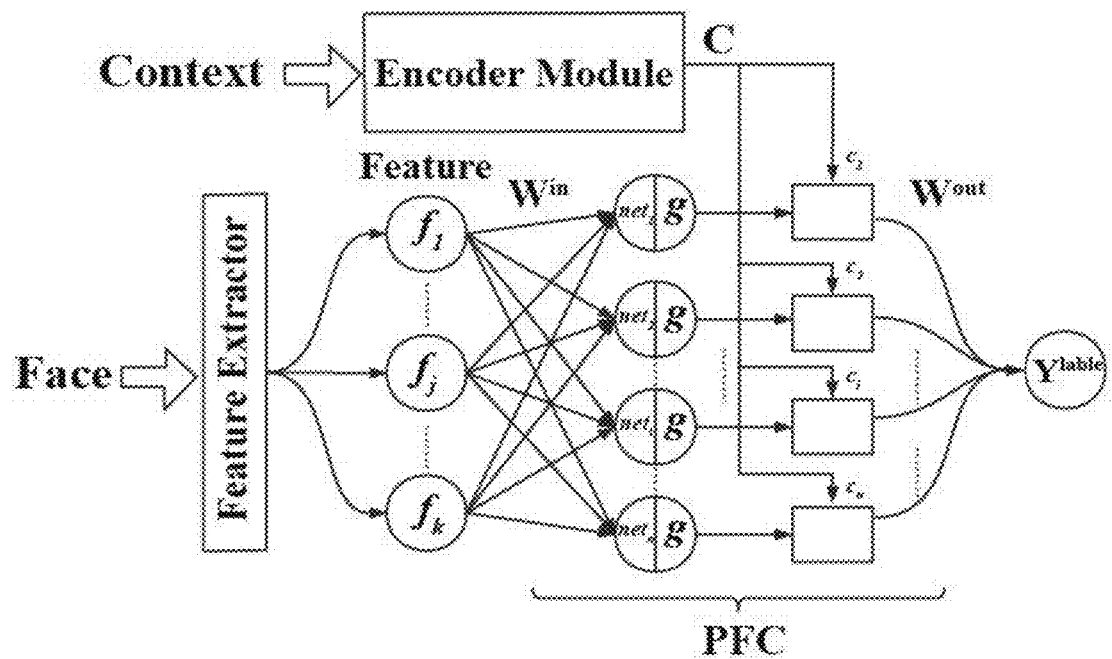
FIG. 2 is a schematic diagram showing the network structure of the information processing method based on the contextual signals and the prefrontal cortex-like network of the present invention.

Step S20: the information feature vector is input into the prefrontal cortex-like network, and dimensional matching is performed between the information feature vector and each contextual signal in the input contextual signal set to obtain the contextual feature vectors to constitute the contextual feature vector set. FIG. 2 is a schematic diagram of the prefrontal cortex-like network structure based on contextual signals according to an embodiment of the present invention.

In the preferred embodiment of the present invention, the English word vectors trained by the default parameters of the gensim toolkit are used as the contextual signals, and the contextual signals of 40 attribute classification tasks are the 200-dimensional word vectors of the corresponding attribute labels.

Step S201: a weight matrix is constructed based on the contextual signals and the prefrontal cortex-like network, and each column of the weight matrix is normalized.

Figure 3:
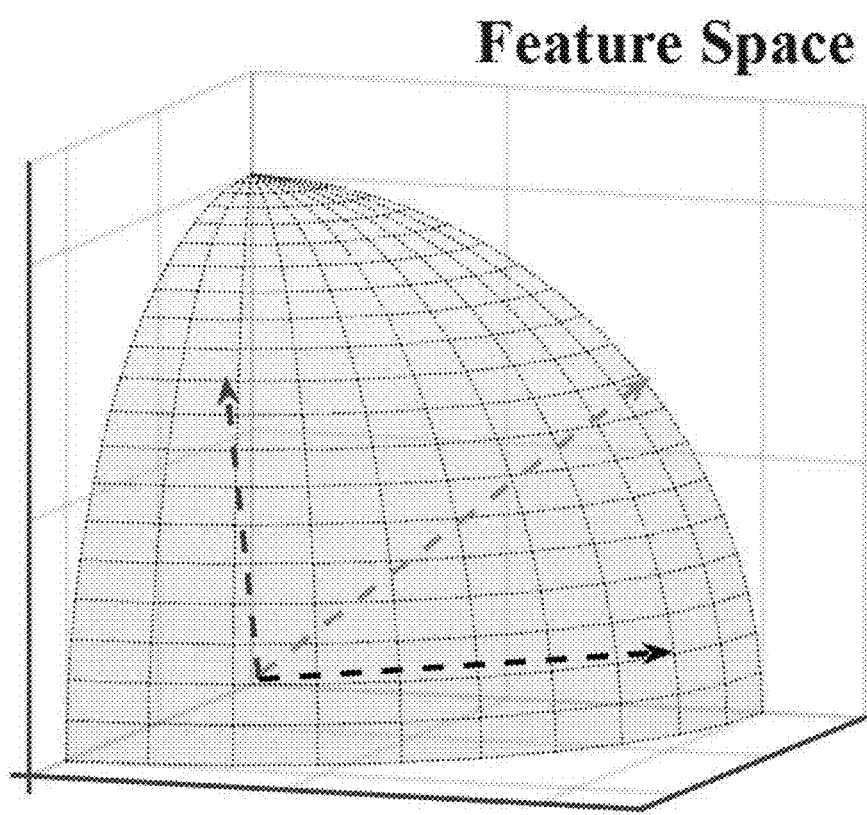
FIG. 3 is a schematic diagram showing the three-dimensional space of an embodiment of the information processing method based on the contextual signals and the prefrontal cortex-like network of the present invention.

The dimension of the contextual signals is 200, and the dimension of the contextual feature vector is 5000. The weight matrix with a size of 200×5000 is constructed. FIG. 3 schematically shows the three-dimensional space of the preferred embodiment of the present invention.

The weight matrix Will is constructed by equation (1):

$$W^{in} = [w_1^{in}, w_2^{in}, \ldots, w_m^{in}] \in R^{k \times m} \quad \text{equation (1)},$$

where, k denotes the dimension of the input feature, and m denotes the dimension of the hidden layer.

Each column of the weight matrix is normalized by equation (2):

$$\|w_i^{in}\| = 1, i = 1, 2, \ldots, m \quad \text{equation (2)},$$

where, i denotes the dimension index of the input feature.

Step S202: based on the weight matrix, dimensional matching is performed between the contextual signal and the information feature vector to obtain the contextual feature vectors, as shown in equation (3):

$$Y^{out} = g((w^{in})^T F) \odot C$$

$$= g([w_1^{in}, w_2^{in}, \ldots, w_m^{in}]^T F) \odot C$$

$$= g([c_1 \|F\| \|w_1^{in}\| \cos \theta_1, c_2 \|F\| \|w_2^{in}\| \cos \theta_2, \ldots, c_m \|F\| \|w_m^{in}\| \cos \theta_m]^T)$$

$$= g([c_1 \|w_1^{in}\| \cos \theta_1, c_2 \|w_2^{in}\| \cos \theta_2, \ldots, c_m \|w_m^{in}\| \cos \theta_m]^T) \|F\|$$

$$= g([c_1 \cos \theta_1, c_2 \cos \theta_2, \ldots, c_m \cos \theta_m]^T) \|F\| \quad \text{equation (3)},$$

where, $Y^{out}$ denotes the contextual feature vectors, and $Y^{out} = [y_1, y_2, \ldots, y_m]_T \in R_m$; F denotes the information feature vector, and $F=[f_1, f_2, \ldots, f_k]^T \in R^k$; C denotes the contextual signal, and $C=[c_1, c_2, \ldots, c_m]^T \in R^m$; ⊙ denotes element-wise multiplication of the vector; $\theta_m$ denotes the angle between $w_m^{in}$ and F, and $g=\max(0,x)$; $W^{in}$ denotes the weight matrix, and $W^{in}=[w_1^{in}, w_2^{in}, \ldots, w_m^{in}] \in R^{k \times m}$.

Step S203: the contextual feature vector set is constructed by the contextual feature vectors obtained after performing the dimensional matching between each contextual signal in the contextual signal set and the input information feature vector.

Step S30: each feature vector in the contextual feature vector set is classified by a feature vector classifier to obtain classification information of the each feature vector to constitute a classification information set, wherein the feature vector classifier is a mapping network of the contextual feature vectors and classification information.

The feature vector classifier is constructed based on equation (4) and equation (5):

$$Y^{Lable}=(W^{out})^T Y^{out}=\|W^{out}\|\|F\|\cos\phi \quad \text{equation (4)},$$

$$\phi = \arccos\left(\frac{\sum_{j=1}^{n} w_j c_j g(\cos\theta_j)}{\|W^{out}\|}\right), \quad \text{equation (5)}$$

where, $Y^{Lable}$ denotes the classification information, $W^{out}$ denotes the classification weight of the classifier, $Y^{out}$ denotes the output feature of the prefrontal cortex-like network, n denotes the dimension of the output weight of the prefrontal cortex-like network, and F denotes the information feature vector.

Figure 4:
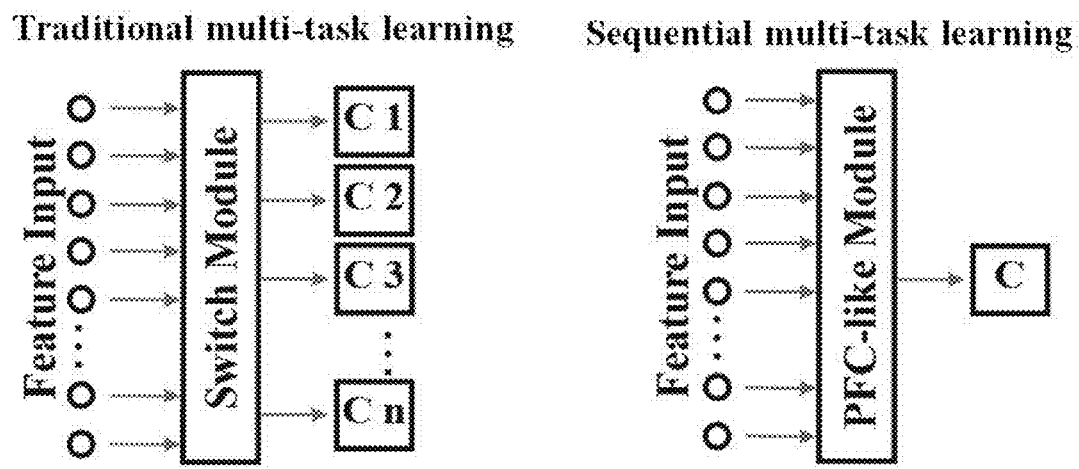
FIG. 4 is a schematic diagram showing the network architectures of the traditional multi-task learning network and the sequential multi-task learning network according to the information processing method based on the contextual signals and the prefrontal cortex-like network of the present invention.

FIG. 4 is a schematic diagram showing the network architectures of the traditional multi-task learning network and the sequential multi-task learning network according to the information processing method based on the contextual signals and the prefrontal cortex-like network of the present invention, wherein C represents the classifier. In order to achieve context-dependent processing, a switch module and n classifiers are required in multitask training, wherein n represents the number of contextual signals.

Figure 5:
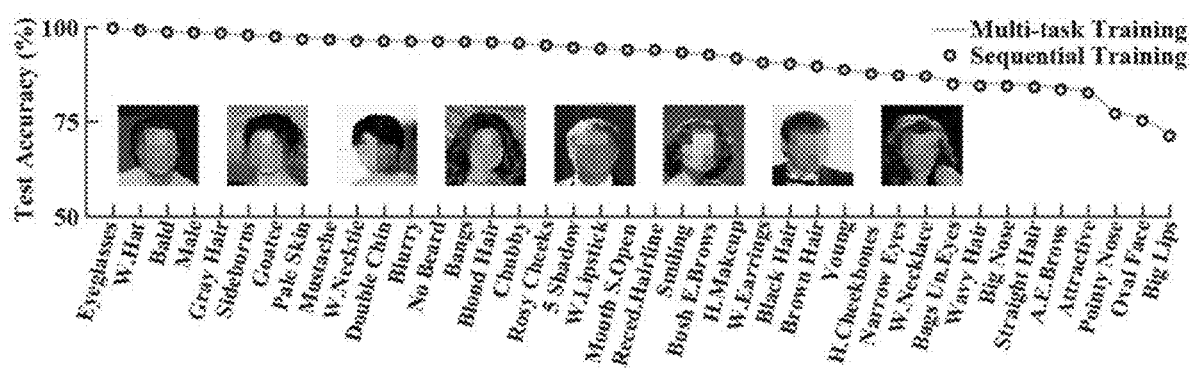
FIG. 5 is a schematic diagram showing the accuracy of the face recognition task of the multi-task training and the sequential multi-scene training according to the information processing method based on the contextual signals and the prefrontal cortex-like network of the present invention.

FIG. 5 is a schematic diagram showing the accuracy of the face recognition task of the multi-task training and the sequential multi-scene training according to the information processing method based on the contextual signals and the prefrontal cortex-like network of the present invention. Each point represents one face attribute, and the number of points is 40 in total. Each attribute is associated with one contextual signal, so that sequential multi-task learning based on contextual signals can be performed to obtain the results of multi-task training.

An information processing system based on contextual signals and a prefrontal cortex-like network according to the second embodiment of the present invention includes an acquisition module, a feature extraction module, a dimensional matching module, a classification module and an output module.

The acquisition module is configured to obtain input information and an input contextual signal set and input.

The feature extraction module is configured to extract the features of the input information by using a feature vector extractor corresponding to the input information to obtain an information feature vector.

The dimensional matching module is configured to input the information feature vector into the prefrontal cortex-like network, and perform dimensional matching between the information feature vector and each contextual signal in the input contextual signal set to obtain contextual feature vectors to constitute a contextual feature vector set.

The classification module is configured to classify each feature vector in the contextual feature vector set by a pre-constructed feature vector classifier to obtain classification information of the each feature vector to constitute a classification information set.

The output module is configured to output the acquired classification information set.

It can be clearly understood by those skilled in the art that for the convenience and brevity of the description, the specific working process and related description of the system described above can refer to the corresponding processes in the foregoing embodiments of the method of the present invention, which will not be repeatedly described here.

It should be noted that the information processing system based on the contextual signals and the prefrontal cortex-like network provided in the above embodiment is only exemplified by the division of the above functional modules. In practical applications, the above functions may be allocated to be completed by different functional modules as needed, that is, the modules or steps in the embodiments of the present invention are further decomposed or combined. For example, the modules in the above embodiments can be combined into one module, or can be further split into a plurality of sub-modules to complete all or a part of the functions of the above description. The designations of the modules and steps involved in the embodiments of the present invention are only intended to distinguish these modules or steps, and should not be construed as an improper limitation of the present invention.

The third embodiment of the present invention provides a storage device, wherein a plurality of programs are stored in the storage device. The programs are configured to be loaded and executed by a processor to implement the information processing method based on the contextual signals and the prefrontal cortex-like network described above.

A processing device according to the fourth embodiment of the present invention includes a processor and a storage device. The processor is configured to execute a plurality of programs, and the storage device is configured to store the plurality of programs. The programs are configured to be loaded and executed by the processor to implement the information processing method based on the contextual signals and the prefrontal cortex-like network described above.

It can be clearly understood by those skilled in the art that for the convenience and brevity of the description, the specific working process and related description of the storage device and the processing device described above can refer to the corresponding processes in the foregoing embodiments of the method of the present invention, which will not be repeatedly described here.

Those skilled in the art can realize that the exemplary modules and steps of methods described with reference to the embodiments disclosed herein can be implemented by electronic hardware, computer software or a combination of the electronic hardware and the computer software. The programs corresponding to modules of software and/or steps of methods can be stored in a random access memory (RAM), a memory, a read-only memory (ROM), an electrically programmable ROM, an electrically erasable programmable ROM, a register, a hard disk, a removable disk, a compact disc read-only memory (CD-ROM), or any other form of storage mediums well-known in the technical field.

In order to clearly illustrate the interchangeability of electronic hardware and software, in the above description, the compositions and steps of each embodiment have been generally described functionally. Whether these functions are performed by electronic hardware or software depends on specific applications and design constraints of the technical solution. Those skilled in the art may use different methods to implement the described functions for each specific application, but such implementation should not be considered beyond the scope of the present invention.

The terminology "include/comprise" or any other similar terminologies are intended to cover non-exclusive inclusions, so that a process, method, article or apparatus/device including a series of elements not only includes those elements but also includes other elements that are not explicitly listed, or further includes elements inherent in the process, method, article or apparatus/device.

Hereto, the technical solutions of the present invention have been described in combination with the preferred implementations with reference to the drawings. However, it is easily understood by those skilled in the art that the scope of protection of the present invention is obviously not limited to these specific embodiments. Without departing from the principle of the present invention, those skilled in the art can make equivalent modifications or replacements to related technical features, and the technical solutions obtained through these modifications or replacements shall fall within the scope of protection of the present invention.

What is claimed is:

1. An information processing method based on contextual signals and a prefrontal cortex-like network, comprising:
   selecting a feature vector extractor based on obtained information to perform feature extraction to obtain an information feature vector;
   inputting the information feature vector into the prefrontal cortex-like network, and performing dimensional matching between the information feature vector and each contextual signal in an input contextual signal set to obtain contextual feature vectors, and constituting a contextual feature vector set according to the contextual feature vectors; and
   classifying each contextual feature vector of the contextual feature vectors in the contextual feature vector set by a feature vector classifier to obtain classification information of the each contextual feature vector, and constituting a classification information set according to the classification information of the each contextual feature vector, wherein the feature vector classifier is a mapping network of the contextual feature vectors and the classification information.

2. The information processing method based on the contextual signals and the prefrontal cortex-like network of claim 1, wherein, the step of selecting the feature vector extractor comprises:
   based on a preset feature vector extractor library, selecting the feature vector extractor corresponding to a category of the obtained information.

3. The information processing method based on the contextual signals and the prefrontal cortex-like network of claim 2, wherein, a method for constructing the feature vector extractor comprises:
   based on a training data set, iteratively updating a weight of a parameter in a feature vector extraction network by an Adam algorithm to obtain a trained feature vector extraction network, wherein the feature vector extraction network is constructed based on a deep neural network; and using a network obtained after removing a last classification layer of the trained feature vector extraction network as the feature vector extractor.

4. The information processing method based on the contextual signals and the prefrontal cortex-like network of claim 1, wherein, the step of inputting the information feature vector into the prefrontal cortex-like network and performing the dimensional matching between the information feature vector and the each contextual signal in the input contextual signal set to obtain the contextual feature vectors step S20 comprises:
   constructing a weight matrix based on the contextual signals and the prefrontal cortex-like network, and normalizing each column of the weight matrix;

$$W^{in}=[w_1^{in},w_2^{in},\ldots,w_m^{in}]\in R^{k\times m}$$

$$\|w_i^{in}\|=1, i=1,2,\ldots,m,$$

where, $W^{in}$ denotes the weight matrix, $\|W_i^{in}\|$ denotes a normalized module of $W_i^{in}$, i denotes a dimension index of a hidden layer, k denotes a dimension of an input feature, and m denotes a dimension of the hidden layer;
   based on the weight matrix, performing the dimensional matching between the each contextual signal and the information feature vector to obtain the contextual feature vectors;

$$y_{out}=g([c_1\cos\theta_1,c_2\cos\theta_2,\ldots,c_m\cos\theta_m]^T)\|F\|,$$

where, $Y^{out}$ denotes the contextual feature vectors, and $Y^{out}=[y_1, y_2, \ldots, y_m]^T\in R^m$; F denotes the information feature vector, and $F=[f_1, f_2, \ldots, f_k]^T\in R^k$; C denotes the each contextual signal, and $C=[c_1, c_2, \ldots, c_m]^T\in^m$; $\theta_m$ denotes an angle between $w_m^{in}$ and F, and g=max(0,x); $W^{in}$ denotes the weight matrix, and $W^{in}=[w_1^{in}, w_2^{in}, \ldots, w_m^{in}]\in R^{k\times m}$; and
   constructing the contextual feature vector set by the contextual feature vectors obtained after performing the dimensional matching between each contextual signal in the contextual signal set and the information feature vector.

5. The information processing method based on the contextual signals and the prefrontal cortex-like network of claim 1, wherein, the feature vector classifier in is constructed based on the following equations:

$$Y^{Lable}=(W^{out})^T Y^{out}=\|W^{out}\|\|F\|\cos\phi,$$

$$\phi=\arccos(\Sigma_{i=1}^m W_i^{out}c_ig(\cos\theta_i)/\|W^{out}\|),$$

where, $Y^{Lable}$ denotes the classification information, $W^{out}$ denotes a classification weight of the classifier, $Y^{out}$ denotes an output feature of the prefrontal cortex-like network and F denotes the information feature vector.

6. The information processing method based on the contextual signals and the prefrontal cortex-like network of claim 3, wherein, configuration parameters of the Adam algorithm comprise:
   a learning rate of 0.1, a weight decay rate of 0.0001, and a batch size of 256.

7. The information processing method based on the contextual signals and the prefrontal cortex-like network of claim 3, wherein, the each contextual signal is a multi-dimensional word vector corresponding to a classification attribute, and a dimension of the multi-dimensional word vector is 200.

8. The information processing method based on the contextual signals and the prefrontal cortex-like network of claim 4, wherein, the weight matrix $W^{in}$ is:

a matrix constructed based on a dimension of a word vector and a dimension of the prefrontal cortex-like network, wherein the matrix has a size of multiplying the dimension of the word vector by the dimension of the prefrontal cortex-like network.

9. An information processing system based on contextual signals and a prefrontal cortex-like network, comprising an acquisition module, a feature extraction module, a dimensional matching module, a classification module and an output module; wherein, the acquisition module is configured to obtain input information and an input contextual signal set and input;

the feature extraction module is configured to extract features of the input information by using a feature vector extractor corresponding to the input information to obtain an information feature vector;

the dimensional matching module is configured to input the information feature vector into the prefrontal cortex-like network, perform dimensional matching between the information feature vector and each contextual signal in the input contextual signal set to obtain a-contextual feature vectors, and constitute a contextual feature vector set according to the contextual feature vectors;

the classification module is configured to classify each contextual feature vector of the contextual feature vectors in the contextual feature vector set by a pre-constructed feature vector classifier to obtain classification information of the each contextual feature vector, and to constitute a classification information set according to the classification information of the each contextual feature vector; and the output module is configured to output the classification information set.

10. A storage device, wherein a plurality of programs are stored in the storage device, and the plurality of programs are configured to be loaded and executed by a processor to implement the information processing method based on the contextual signals and the prefrontal cortex-like network of claim 1.

11. A processing device, comprising:
a processor, and
a storage device, wherein
the processor is configured to execute a plurality of programs, and the storage device is configured to store the plurality of programs;
the plurality of programs are configured to be loaded and executed by the processor to implement the information processing method based on the contextual signals and the prefrontal cortex-like network of claim 1.

12. The storage device of claim 10, wherein, the step of selecting the feature vector extractor comprises:
based on a preset feature vector extractor library, selecting the feature vector extractor corresponding to a category of the obtained information.

13. The storage device of claim 12, wherein, a method for constructing the feature vector extractor comprises:
based on a training data set, iteratively updating a weight of a parameter in a feature vector extraction network by an Adam algorithm to obtain a trained feature vector extraction network, wherein the feature vector extraction network is constructed based on a deep neural network; and
using a network obtained after removing a last classification layer of the trained feature vector extraction network as the feature vector extractor.

14. The storage device of claim 10, wherein, the step of inputting the information feature vector into the prefrontal cortex-like network and performing the dimensional matching between the information feature vector and the each contextual signal in the input contextual signal set to obtain the contextual feature vectors comprises:

constructing a weight matrix based on the contextual signals and the prefrontal cortex-like network, and normalizing each column of the weight matrix;

$$W^{in}=[w_1^{in}, w_2^{in}, \ldots, w_m^{in}] \in R^{k \times m}$$

$$\|w_i^{in}\|=1, i=1, 2, \ldots, m,$$

where, $W^{in}$ denotes the weight matrix, $\|W_i^{in}\|$ denotes a normalized module of $W_i^{in}$, i denotes a dimension index of a hidden layer, k denotes a dimension of an input feature, and m denotes a dimension of the hidden layer;

based on the weight matrix, performing the dimensional matching between the each contextual signal and the information feature vector to obtain the contextual feature vectors;

$$Y_{out}=g([c_1 \cos\theta_1, c_2 \cos\theta_2, \ldots, c_m \cos\theta_m]^T)\|F\|,$$

where, $Y^{out}$ denotes the contextual feature vectors, and $Y^{out}=[y_1, y_2, \ldots, y_m]^T \in R^m$; F denotes the information feature vector, and $F=[f_1, f_2, \ldots, f_k]^T \in R^k$; C denotes the each contextual signal, and $C=[c_1, c_2, \ldots, c_m]^T \in R^m$; $\theta_m$ denotes an angle between $w_m^{in}$ and F, and g=max(0,x); $W^{in}$ denotes the weight matrix, and $w^{in}=[w_1^{in}, w_2^{in}, \ldots, W_m^{in}] \in R^{k+m}$; and constructing the contextual feature vector set by the contextual feature vectors obtained after performing the dimensional matching between each contextual signal in the contextual signal set and the information feature vector.

15. The storage device of claim 10, wherein, the feature vector classifier is constructed based on the following equations:

$$Y^{Lable}=(W^{out})^T Y^{out}=\|W^{out}\|\|F\|\cos\phi,$$

$$\phi=\arccos(\Sigma_{i=1}^m w_i^{out} c_i g(\cos\theta_i)/\|W^{out}\|),$$

where, $Y^{Lable}$ denotes the classification information, $W^{out}$ denotes a classification weight of the classifier, $Y^{out}$ denotes an output feature of the prefrontal cortex-like network, and F denotes the information feature vector.

16. The storage device of claim 13, wherein, configuration parameters of the Adam algorithm comprise:
a learning rate of 0.1, a weight decay rate of 0.0001, and a batch size of 256.

17. The storage device of claim 13, wherein, the each contextual signal is a multi-dimensional word vector corresponding to a classification attribute, and a dimension of the multi-dimensional word vector is 200.

18. The storage device of claim 14, wherein, the weight matrix $W^{in}$ is:
a matrix constructed based on a dimension of a word vector and a dimension of the prefrontal cortex-like network, wherein the matrix has a size of multiplying the dimension of the word vector by the dimension of the prefrontal cortex-like network.

19. The processing device of claim 11, wherein, the step of selecting the feature vector extractor comprises:
based on a preset feature vector extractor library, selecting the feature vector extractor corresponding to a category of the obtained information.

20. The processing device of claim 19, wherein, a method for constructing the feature vector extractor comprises:
- based on a training data set, iteratively updating a weight of a parameter in a feature vector extraction network by an Adam algorithm to obtain a trained feature vector extraction network, wherein the feature vector extraction network is constructed based on a deep neural network; and
- using a network obtained after removing a last classification layer of the trained feature vector extraction network as the feature vector extractor.

* * * * *